United States Patent
Yoshizawa et al.

(10) Patent No.: US 8,417,163 B2
(45) Date of Patent: Apr. 9, 2013

(54) RESIN MATERIAL, ENDLESS BELT FOR IMAGE FORMING APPARATUS, ROLLER FOR IMAGE FORMING APPARATUS, IMAGE FIXING DEVICE, AND IMAGE FORMING APPARATUS

(75) Inventors: Hisae Yoshizawa, Kanagawa (JP); Kaoru Torikoshi, Kanagawa (JP); Kazunori Anazawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 12/852,981

(22) Filed: Aug. 9, 2010

(65) Prior Publication Data
US 2011/0200837 A1    Aug. 18, 2011

(30) Foreign Application Priority Data
Feb. 12, 2010   (JP) ................. 2010-029211

(51) Int. Cl.
*G03G 15/01*   (2006.01)
(52) U.S. Cl. .......... 399/302; 399/308; 399/333
(58) Field of Classification Search .......... 399/333, 399/302, 308
See application file for complete search history.

(56) References Cited

U.S. PATENT DOCUMENTS

| | | | |
|---|---|---|---|
| 6,476,151 B1 | 11/2002 | Araki et al. | |
| 6,935,994 B2 | 8/2005 | Nakano | |
| 2006/0073342 A1* | 4/2006 | Ariga et al. | |
| 2007/0286957 A1* | 12/2007 | Suzuki et al. | |
| 2009/0010690 A1* | 1/2009 | Kanesugi et al. | |

FOREIGN PATENT DOCUMENTS

| | | |
|---|---|---|
| JP | A-10-142990 | 5/1998 |
| JP | A-11-231684 | 8/1999 |
| JP | A-2001-183935 | 7/2001 |
| JP | A-2007-31690 | 2/2007 |
| JP | B2-4244520 | 1/2009 |

* cited by examiner

Primary Examiner — David Gray
Assistant Examiner — Laura Roth
(74) Attorney, Agent, or Firm — Oliff & Berridge, PLC (57) ABSTRACT

Described herein are resin materials used for a member for an image forming apparatus. These resin materials can include a polymer formed by polymerization of at least one acrylic resin having (i) a content ratio (molar ratio) of hydroxyl groups of side chains each containing 10 or more carbon atoms to hydroxyl groups of side chains each containing less than 10 carbon atoms that is less than 1/3; (ii) at least one polyol that contains plural hydroxyl groups in which all the hydroxyl groups are connected together through a chain containing 6 or more carbon atoms; and (iii) an isocyanate. The resin material can further include a polymerization ratio of about 0.1 or more and about 10 or less, the polymerization ratio being a ratio (B/A) of a total molar amount (B) of hydroxyl groups contained in all the polyols used for the polymerization to a total molar amount (A) of hydroxyl groups contained in all the acrylic resins used for the polymerization.

18 Claims, 6 Drawing Sheets

RESIN MATERIAL, ENDLESS BELT FOR IMAGE FORMING APPARATUS, ROLLER FOR IMAGE FORMING APPARATUS, IMAGE FIXING DEVICE, AND IMAGE FORMING APPARATUS

CROSS-REFERENCE TO RELATED APPLICATIONS

This application is based on and claims priority under 35 USC 119 from Japanese Patent Application No. 2010-029211 filed Feb. 12, 2010.

BACKGROUND (i) Technical Field

The present invention relates to a resin material, an endless belt for an image forming apparatus, a roller for an image forming apparatus, an image fixing device, and an image forming apparatus.

SUMMARY

According to an aspect of the invention, there is provided a resin material used for a member for an image forming apparatus, the resin material including a polymer, wherein the polymer is formed by polymerization of at least one acrylic resin in which a content ratio (molar ratio) of hydroxyl groups of side chains each containing 10 or more carbon atoms to hydroxyl groups of side chains each containing less than 10 carbon atoms is less than 1/3 (the acrylic resin may contain no hydroxyl group of a side chain containing 10 or more carbon atoms); at least one polyol that contains plural hydroxyl groups in which all the plural hydroxyl groups are connected together through a chain containing 6 or more carbon atoms; and an isocyanate, with a polymerization ratio of about 0.1 or more and about 10 or less, the polymerization ratio being a ratio (B/A) of a total molar amount (B) of hydroxyl groups contained in all the polyols used for the polymerization to a total molar amount (A) of hydroxyl groups contained in all the acrylic resins used for the polymerization.

BRIEF DESCRIPTION OF THE DRAWINGS

Exemplary embodiments of the present invention will be described in detail based on the following figures, wherein.

DETAILED DESCRIPTION

Resin Material Used for Member for Image Forming Apparatus

A resin material used for a member for an image forming apparatus according to an exemplary embodiment includes a polymer formed by polymerization of at least one acrylic resin in which a content ratio (molar ratio) of hydroxyl groups of side chains each containing 10 or more carbon atoms (long side chain hydroxyl groups) to hydroxyl groups of side chains each containing less than 10 carbon atoms (short side chain hydroxyl groups) is less than 1/3 (the acrylic resin may contain no long side chain hydroxyl groups); at least one polyol that contains plural hydroxyl groups in which all the plural hydroxyl groups are connected together through a chain containing 6 or more carbon atoms (hereafter, simply referred to as a "long chain polyol"); and an isocyanate, with a polymerization ratio of 0.1 or more and 10 or less, or about 0.1 or more and about 10 or less, the polymerization ratio being a ratio (B/A) of a total molar amount (B) of hydroxyl groups contained in all the polyols used for the polymerization to a total molar amount (A) of hydroxyl groups contained in all the acrylic resins used for the polymerization.

As described above, a side chain containing 10 or more carbon atoms is defined as a long side chain; and a side chain containing less than 10 carbon atoms is defined as a short side chain. The number of carbon atoms of such a long side chain is preferably 15 or more. The number of carbon atoms of such a short side chain is preferably 6 or less. In particular, such a long side chain may contain a structure in which an ε-lactone ring has been opened, which tends to enhance elasticity.

A resin material formed so as to have the above-described composition by polymerization has a sufficiently high hardness and a high elasticity. When such a resin material is used for a member for an image forming apparatus, the member being brought into contact with recording media such as paper sheets, the member does not directly bounce in response to the impact of recording media but flexibly depresses once to reduce the impact and then recovers from such a depression and goes back to its original shape due to excellent resilience (that is, self-recovery capability). Accordingly, extremely high resistance to scratching (resistance to becoming scratched) and quick removal of scratches (removal of scratches having been formed) are probably achieved.

As described above, a resin material according to an exemplary embodiment is polymerized with a polymerization ratio of 0.1 or more and 10 or less or about 0.1 or more and about 10 or less, the polymerization ratio being a ratio (B/A) of the total molar amount (B) of hydroxyl groups contained in all the polyols used for the polymerization to the total molar amount (A) of hydroxyl groups contained in all the acrylic resins used for the polymerization. That is, the polymerization is performed by controlling the polymerization ratio of the polyols to the acrylic resins in accordance with the molar amount of hydroxyl groups contained in the polyols and the molar amount of hydroxyl groups contained in the acrylic resins such that the ratio (B/A) falls within the above-described range.

Elastic Modulus, Recovery Proportion, and Martens Hardness

A resin material according to an exemplary embodiment may have a high elastic modulus, which results in a high rate of removing scratches.

The elastic modulus may be adjusted by controlling, for example, the structure or the amount of a polyol added or the type of a cross-linking agent.

A resin material according to an exemplary embodiment may have a high recovery proportion in view of resistance to scratching. The recovery proportion is an indicator of the self-recovery capability (the property of recovering from deformation upon removal of a stress, the deformation being caused by the stress; that is, the degree of recovery from scratches) of the resin material.

The recovery proportion may be adjusted by controlling, for example, the amount of long side chain hydroxyl groups, the amount of short side chain hydroxyl groups, the amount of a long chain polyol, the chain length of a long chain polyol, or the type of a cross-linking agent. Specifically, the recovery proportion tends to increase by increasing the amount of long side chain hydroxyl groups and increasing the amount of a long chain polyol. In contrast, the recovery proportion tends to decrease by decreasing the amount of a long chain polyol added.

Although the Martens hardness of a resin material according to an exemplary embodiment depends on an application of the resin material, the resin material preferably has a Martens hardness of 1 N/mm$^2$ or more and 20 N/mm$^2$ or less and, in particular, preferably 2 N/mm$^2$ or more and 10 N/mm$^2$ or less.

When a resin material has a Martens hardness of 1 N/mm$^2$ or more, the shape of a resin layer composed of the resin material is effectively maintained and the resin material is suitably used for a fixing member or the like. However, a material having a relatively low hardness tends to readily remove scratches.

The Martens hardness is adjusted by controlling, for example, the amount of long side chain hydroxyl groups, the amount of short side chain hydroxyl groups, the amount of a long chain polyol, the chain length of a long chain polyol, or the type of a cross-linking agent. Specifically, the Martens hardness tends to increase by decreasing the amount of a long chain polyol added. In contrast, the Martens hardness tends to decrease by increasing the amount of long side chain hydroxyl groups.

Measurement Method

A FISCHERSCOPE HM2000 (manufactured by Fischer Instruments K.K.) is used as a measurement apparatus. A sample resin layer formed by applying a resin to a polyimide film and polymerizing the resin is fixed on a slide glass by using an adhesive agent and placed in the measurement apparatus. The sample resin layer is subjected to an increasing load up to 0.5 mN over 15 seconds at room temperature (23° C.) and the sample resin layer is held under the load of 0.5 mN for 5 seconds. At this time, the maximum displacement of the sample resin layer is defined as h1. After that, the load is decreased to 0.005 mN over 15 seconds and the sample resin layer is held under the load of 0.005 mN for a minute. At this time, the displacement of the sample resin layer is defined as h2. The recovery proportion [(h1−h2)/h1] is then calculated. In addition, the Martens hardness and the elastic modulus are determined from a load displacement curve obtained at this time.

Dynamic Contact Angle (Advancing Contact Angle)

A resin material according to an exemplary embodiment preferably has a dynamic contact angle (advancing contact angle) of 90° or more and 150° or less, or about 90° or more and about 150° or less, in particular, preferably 110° or more and 150° or less.

When the dynamic contact angle (advancing contact angle) is 90° or more or about 90° or more, excellent releasability is provided.

The dynamic contact angle is adjusted by controlling the amount of fluorine atoms contained in the acrylic resin and the long chain polyol.

Measurement Method

The dynamic contact angle (advancing contact angle) is measured in the following manner. A water droplet is dropped on a solid surface of a resin material by using a syringe. The water droplet is expanded by injecting water thereinto. A contact angle at an instant when the contact surface between the resin material and the water increases is measured as the dynamic (advancing) contact angle.

Hereinafter, the composition of a resin material according to an exemplary embodiment will be described.

Acrylic Resin

An acrylic resin according to an exemplary embodiment is an acrylic resin that contains hydroxyl groups of side chains each containing less than 10 carbon atoms. (short side chain hydroxyl groups) and that does not contain hydroxyl groups of side chains each containing 10 or more carbon atoms (long side chain hydroxyl groups); or an acrylic resin in which the content ratio (molar ratio) of long side chain hydroxyl groups to short side chain hydroxyl groups is less than 1/3.

Examples of a monomer for forming such an acrylic resin will be listed below. Examples of a monomer containing a hydroxyl group include (1) ethylenic monomers containing hydroxyl groups such as hydroxymethyl (meth)acrylate, hydroxyethyl (meth)acrylate, hydroxypropyl (meth)acrylate, hydroxybutyl (meth)acrylate, and N-methylolacrylamine. (2) An ethylenic monomer containing a carboxyl group may be used and examples thereof include (meth)acrylic acid, crotonic acid, itaconic acid, fumaric acid, and maleic acid. As for a monomer having no hydroxyl groups, (3) an ethylenic monomer that is polymerizable with (1) and (2) may be used with (1) and/or (2) and examples thereof include (meth)acrylic acid alkyl esters such as methyl (meth)acrylate, ethyl (meth)acrylate, propyl (meth)acrylate, butyl (meth)acrylate, n-propyl (meth)acrylate, n-butyl (meth)acrylate, isobutyl (meth)acrylate, 2-ethylhexyl (meth)acrylate, n-octyl (meth) acrylate, and n-dodecyl (meth)acrylate. When the acrylic resin is made to contain long side chain hydroxyl groups, a monomer in which 3-5 moles of ε-caprolactone is added to hydroxymethyl (meth)acrylate may be used. The acrylic resin may be a single resin or two or more resins.

The acrylic resin does not contain long side chain hydroxyl groups or has a content ratio (molar ratio) of long side chain hydroxyl groups to short side chain hydroxyl groups, the content ratio being less than 1/3.

The acrylic resin may contain a fluorine atom. Examples of an acrylic resin containing a fluorine atom include copolymers prepared by performing the polymerization with an additional monomer such as 2-(perfluorobutyl)ethylacrylate, 2-(perfluorohexyl)ethylacrylate, 2-(perfluorohexyl)ethylmethacrylate, or perfluorohexylethylene.

The content of such a monomer containing a fluorine atom is preferably 0.1 or more and 0.7 or less (molar ratio), more preferably 0.2 or more and 0.5 or less (molar ratio), relative to the entire monomers used for the synthesis of the acrylic resin.

Such an acrylic resin according to an exemplary embodiment is synthesized by a method of mixing the above-described monomers, subjecting the mixed monomers to standard radical polymerization, ionic polymerization, or the like, and then purifying the resultant polymer.

Long Chain Polyol

The long chain polyol that contains plural hydroxyl groups that are all connected together through a chain containing 6 or more carbon atoms (the number of carbon atoms in a linear chain portion through which the hydroxyl groups are connected together) is not particularly restricted. Examples of such a long chain polyol include bifunctional polycaprolactone diols that are compounds represented by the following general formula (1), trifunctional polycaprolactone triols that are compounds represented by the following general formula (2), and tetrafunctional polycaprolactone polyols. Such a long chain polyol may be used alone or in combination of two or more thereof.

(1)

In the formula (1), R represents any one of $C_2H_4$, $C_2H_4OC_2H_4$, and $C(CH_3)_2(CH_2)_2$; and m and n independently represent an integer of 4 or more and 35 or less.

(2)

In the formula (2), R represents any one of $CH_2CHCH_2$, $CH_3C(CH_2)_2$, and $CH_3CH_2C(CH_2)_3$; and l+m+n satisfies an integer of 3 or more and 30 or less.

The long chain polyol may contain a fluorine atom. Examples of a long chain polyol containing a fluorine atom include 1H,1H,9H,9H-perfluoro-1,9-nonanediol, fluorinated tetraethylene glycol, and 1H,1H,8H,8H-perfluoro-1,8-octanediol.

As for the content of such a long chain polyol containing a fluorine atom, the long chain polyol containing a fluorine atom is added such that a ratio (B/A) is 0.1 or more and 10 or less, or about 0.1 or more and about 10 or less, the ratio (B/A) being a ratio of the total molar amount (B) of hydroxyl groups contained in all the long chain polyols (including long chain polyols containing fluorine atoms and long chain polyols not containing fluorine atoms) used for the polymerization to the total molar amount (A) of hydroxyl groups contained in all the acrylic resins used for the polymerization.

The number of functional groups of the long chain polyol is preferably 2 to 5, more preferably 2 to 3.

The ratio (B/A) of the total molar amount (B) of hydroxyl groups contained in all the long chain polyols used for the polymerization to the total molar amount (A) of hydroxyl groups contained in all the acrylic resins used for the polymerization is 0.1 or more and 10 or less, or about 0.1 or more and about 10 or less. The ratio (B/A) is preferably 1 or more and 4 or less.

When the ratio is 0.1 or more and 10 or less, or about 0.1 or more and about 10 or less, high resistance to scratching is provided.

Isocyanate

The isocyanate functions as a cross-linking agent that crosslinks the acrylic resin and the long chain polyol, the acrylic resins, or the long chain polyols. The isocyanate is not particularly restricted. Examples of the isocyanate include methylene diisocyanate, toluene diisocyanate, hexamethylene diisocyanate, and isophorone diisocyanate. As for such an isocyanate, a single isocyanate or two or more isocyanates may be used.

As for the content of the isocyanate, the number of moles of isocyanate groups may be 0.5 times or more and 3 times or less the total number of moles of hydroxyl groups of the acrylic resin and the polyol.

Polymerization Method

Hereinafter, a method for forming a resin material according to an exemplary embodiment (a method for polymerizing a resin) will be described. A method for forming a sample is as follows. An acrylic resin, a long chain polyol, and an isocyanate are mixed together. The resultant mixture is subjected to defoaming under a reduced pressure and then cast onto a polyimide film having a thickness of 90 μm to form a resin layer sample for evaluation. The resin layer sample is heated at 85° C. for 60 minutes and at 130° C. for 0.5 hours to be cured. Practically, the mixture is applied to a surface that is to be protected and then heated in a similar manner to be cured.

The thus-obtained resin material according to an exemplary embodiment is used for a surface protective layer for an endless belt or a roller in an image forming apparatus. In particular, such a resin material is suitably used for a fixing belt or a fixing roller of a fixing device, an intermediate transfer belt or an intermediate transfer roller of an intermediate transfer device, a recording medium transport belt, a recording medium transport roller, a frame surface, or the like.

Hereinafter, a member for an image forming apparatus including a resin material according to an exemplary embodiment will be described.

Endless Belt

Figure 1:
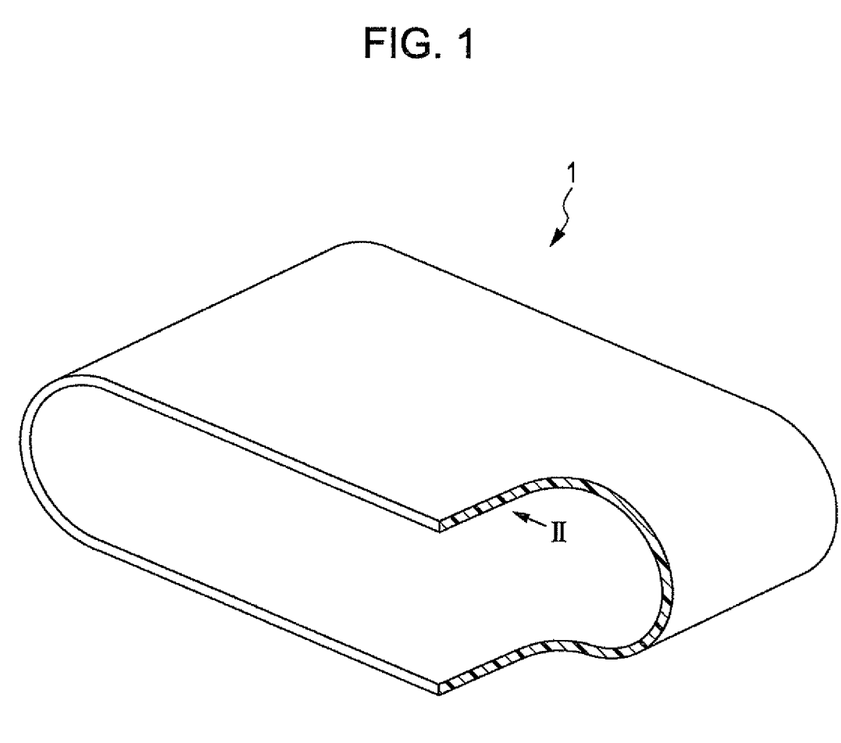
FIG. 1 is a perspective view schematically illustrating the configuration of an endless belt according to an exemplary embodiment.
Figure 2:
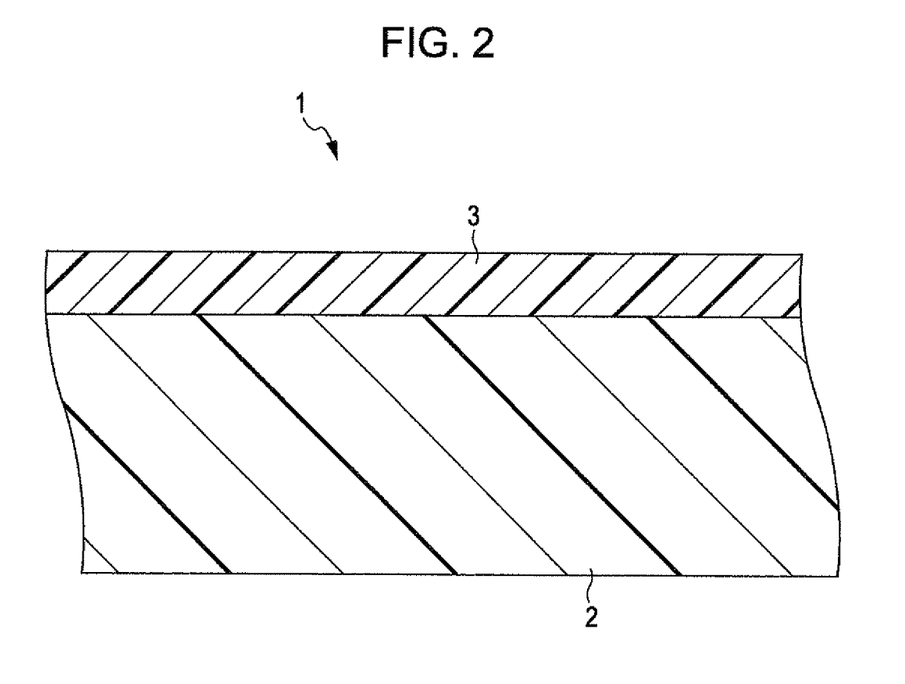
FIG. 2 is a sectional view of an endless belt according to an exemplary embodiment.

FIG. 1 is a perspective (partially cutaway) view of an endless belt according to an exemplary embodiment. FIG. 2 is a sectional view of the endless belt viewed in the direction of arrow II in FIG. 1.

As illustrated in FIGS. 1 and 2, an endless belt 1 according to an exemplary embodiment is an endless belt including a base member 2 and a surface layer 3 stacked on a surface of the base member 2.

For the surface layer 3, the above-described resin material according to an exemplary embodiment is used.

An application of the endless belt 1 is, for example, a fixing belt, an intermediate transfer belt, or a recording medium transport belt in an image forming apparatus.

Hereinafter, a case where the endless belt 1 is used as a fixing belt will be described.

A material used for the base member 2 may be a heat resistant material. Specifically, such a material may be selected from existing various plastic materials and metal materials.

Among plastic materials, those generally referred to as engineering plastics are suitably used. Preferred examples of such engineering plastics include fluorocarbon resins, polyimide (PI), polyamide imide (PAI), polybenzimidazole (PBI), polyether ether ketone (PEEK), polysulfone (PSU), polyether sulfone (PES), polyphenylene sulfide (PPS), polyether imide (PEI), and wholly aromatic polyesters (liquid crystal polymers). Of these, those that are excellent in terms of mechanical strength, heat resistance, wear resistance, chemical resistance, and the like such as thermosetting polyimide, thermoplastic polyimide, polyamide imide, polyether imide, and fluorocarbon resins are preferred.

A metal material used for the base member 2 is not particularly restricted. Various metals and alloy materials may be used. For example, SUS, nickel, copper, aluminum, iron, or the like is suitably used. Such a heat resistant resin and such a metal material may be stacked to form a multilayer structure.

Hereinafter, a case where the endless belt 1 is used as an intermediate transfer belt or a recording medium transport belt will be described.

Examples of a material used for the base member 2 may be polyimide resins, polyamide imide resins, polyester resins, polyamide resins, and fluorocarbon resins. Of these, use of a polyimide resin and a polyamide imide resin is preferred. The base member 2 may include a joint or not as long as the base member 2 is annular (endless). The base member 2 may generally have a thickness of 0.02 to 0.2 mm.

When the endless belt 1 is used as an intermediate transfer belt or a recording medium transport belt of an image forming apparatus, the surface resistivity of the endless belt 1 may be controlled within the range of $1\times10^9$ to $1\times10^{14}$ ohms per square and the volume resistivity of the endless belt 1 may be controlled within the range of $1\times10^8$ to $1\times10^{13}$ $\Omega$cm. To achieve such conditions, if necessary, a conductive agent may be added to the base member 2 and/or the surface layer 3 as described above. An example of such a conductive agent is carbon black such as Ketjenblack or acetylene black; graphite; a metal or an alloy such as aluminum, nickel, or a copper alloy; a metal oxide such as tin oxide, zinc oxide, potassium titanate, a composite oxide of tin oxide-indium oxide, or a composite oxide of tin oxide-antimony oxide; or a conductive polymer such as polyaniline, polypyrrole, polysulfone, or polyacethylene (here, the term "conductive" of the polymer refers to having a volume resistivity of less than $10^7$ $\Omega$cm). Such a conductive agent may be used alone or in combination of two or more thereof.

The surface resistivity and the volume resistivity are measured with a UR probe of a Hiresta UPMCP-450 manufactured by DIA Instruments Co., Ltd. in an environment at 22° C. and 55% RH in compliance with JIS-K6911.

In the cases of fixing applications, the endless belt 1 may include an elastic layer between the base member 2 and the surface layer 3. Examples of a material of such an elastic layer include various rubber materials. Examples of such various rubber materials include polyurethane rubbers, ethylene propylene rubbers (EPM), silicone rubbers, and fluoro rubbers (EKM). In particular, silicone rubbers, which are excellent in terms of heat resistance and processibility, are preferred. Examples of such silicone rubbers include room temperature vulcanization (RTV) silicone rubbers and high temperature vulcanization (HTV) silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

When the endless belt 1 is used as a fixing belt in an electromagnetic induction fixing device, a heating layer may be disposed between the base member 2 and the surface layer 3.

A material used for the heating layer is, for example, a nonmagnetic metal. Specific examples of such a nonmagnetic metal include metal materials such as gold, silver, copper, aluminum, zinc, tin, lead, bismuth, beryllium, antimony, and alloys of the foregoing metals (alloys containing the foregoing metals).

The heating layer preferably has a thickness within the range of 5 to 20 μm, more preferably within the range of 7 to 15 μm, and, in particular, preferably within the range of 8 to 12 μm.

Roller

Hereinafter, a roller according to an exemplary embodiment will be described. A roller according to an exemplary embodiment is a substantially tubular roller including a base member and a surface layer stacked on a surface of the base member.

For the surface layer, the above-described resin material according to an exemplary embodiment is used.

An application of such a tubular roller is, for example, a fixing roller, an intermediate transfer roller, or a recording medium transport roller in an image forming apparatus.

Hereinafter, a case where such a tubular roller is used as a fixing roller will be described.

Figure 4:
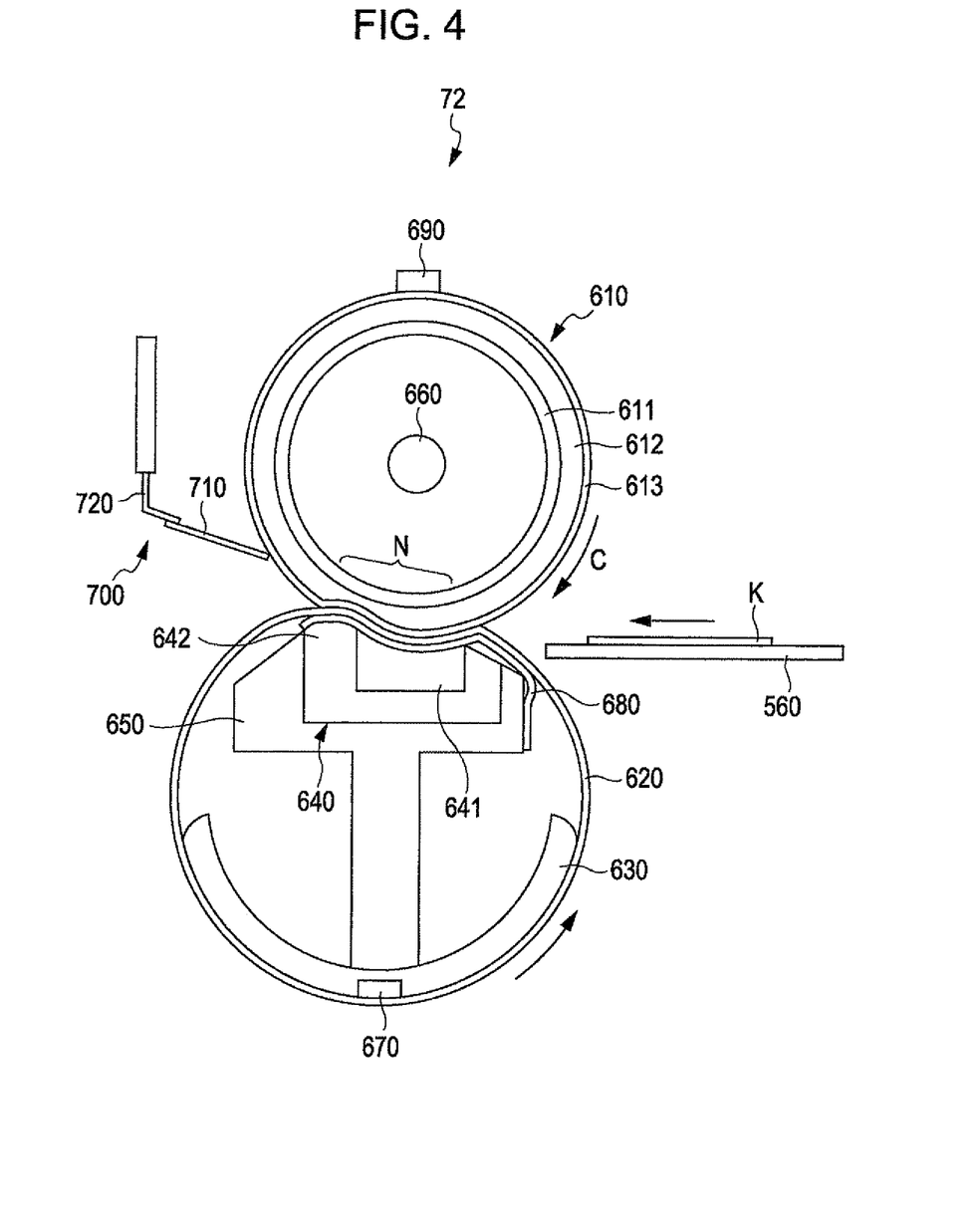
FIG. 4 is a schematic view illustrating the configuration of an image fixing device including an endless belt according to an exemplary embodiment.

A fixing roller 610 illustrated in FIG. 4 and serving as a fixing member is not particularly restricted in terms of shape, structure, size, or the like. The fixing roller 610 includes a tubular core 611 and a surface layer 613 on the tubular core 611. As illustrated in FIG. 4, an elastic layer 612 may be disposed between the core 611 and the surface layer 613.

A material of the tubular core 611 is, for example, a metal such as aluminum (e.g. A-5052 member), SUS, iron, or copper, an alloy, a ceramic, or a fiber reinforced metal (FRM). The tubular core 611 in a fixing device 72 according to an exemplary embodiment is constituted by a tubular member having an outer diameter of 25 mm, a wall thickness of 0.5 mm, and a length of 360 mm.

A material of the elastic layer 612 may be selected from existing materials and any elastic body having high heat resistance may be used. In particular, an elastic body of, for example, a rubber or an elastomer having a rubber hardness of about 15° to 45° (JIS-A) is preferably used. Examples of such an elastic body include silicone rubbers and fluoro rubbers.

In an exemplary embodiment, of these materials, silicone rubbers are preferred in view of small surface tension and excellent elasticity. Examples of such silicone rubbers include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ).

The elastic layer 612 preferably has a thickness of 3 mm or less, more preferably, a thickness within the range of 0.5 to 1.5 mm. In the fixing device 72 according to a first exemplary embodiment, a core is covered with a 72 μm-thick layer composed of a HTV silicone rubber having a rubber hardness of 35° (JIS-A).

The surface layer 613 preferably has a thickness of 5 to 50 μm, more preferably 10 to 30 μm.

As for a heating source for heating the fixing roller 610, as described above, for example, a halogen lamp 660 is used. As long as the heating source has a shape and a structure such that the heating source is installed inside the core 611, the heating source is not particularly restricted and is selected in accordance with a purpose. The surface temperature of the fixing roller 610 heated with the halogen lamp 660 is measured with a thereto-sensitive device 690 provided for the fixing roller 610 and the surface temperature is controlled to be constant by a controller. The thermo-sensitive device 690 is not particularly restricted and may be a thermistor, temperature sensor, or the like.

Image Forming Apparatus and Image Fixing Device

First Exemplary Embodiment

Figure 3:
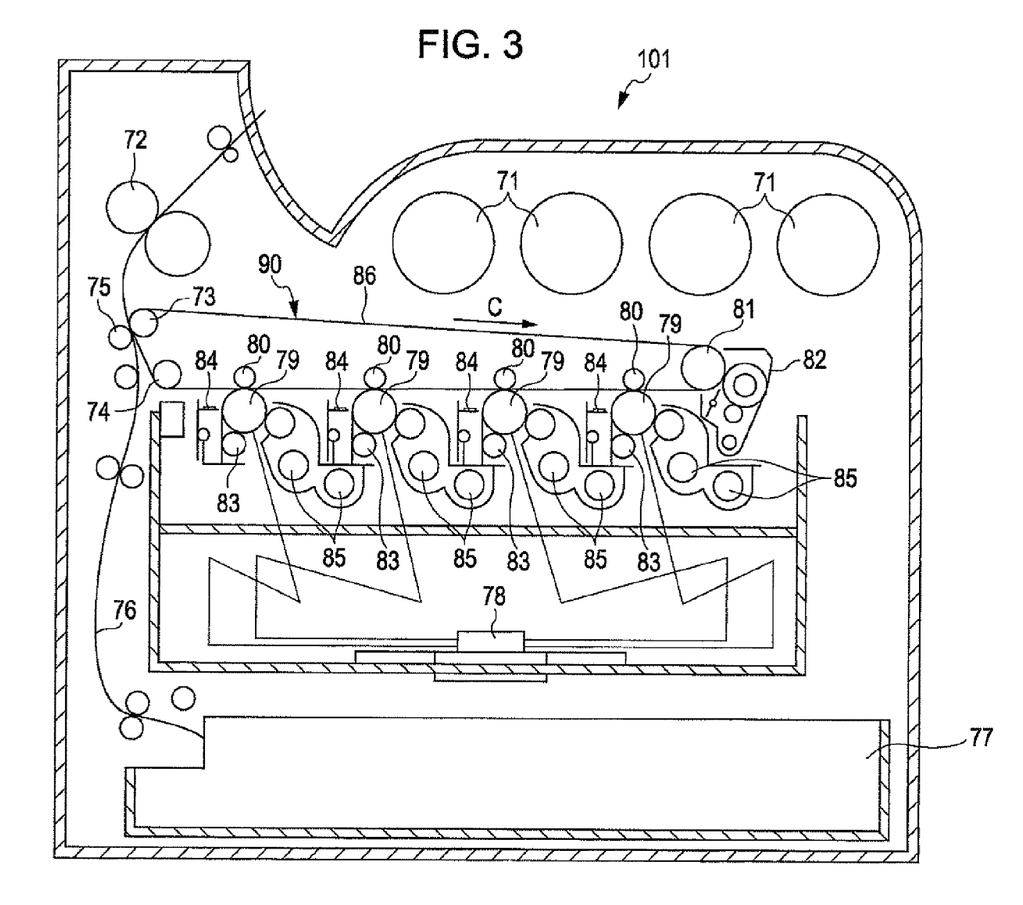
FIG. 3 is a schematic view illustrating the configuration of an image forming apparatus including an endless belt according to an exemplary embodiment.

Hereinafter, an image forming apparatus according to a first exemplary embodiment including an endless belt according to an exemplary embodiment and a roller according to an exemplary embodiment will be described. FIG. 3 is a schematic view for illustrating a portion of a tandem-system image forming apparatus including an endless belt according to an exemplary embodiment serving as a pressure belt of a fixing device, an endless belt according to an exemplary embodiment serving as an intermediate transfer belt, and a roller according to an exemplary embodiment serving as a fixing roller of the fixing device.

Specifically, an image forming apparatus 101 includes a photoconductor body 79 (electrostatic latent image holding body), a charging roller 83 for charging the surface of the photoconductor body 79, a laser generating device 78 (electrostatic latent image forming part) for forming an electrostatic latent image by exposing the surface of the photoconductor body 79, a developing device 85 (developing part) for developing the latent image formed on the surface of the photoconductor body 79 by using a developer to form a toner image, an intermediate transfer belt 86 (intermediate transfer body) onto which the toner image formed by the developing device 85 is transferred from the photoconductor body 79, a first transfer roller 80 (first transfer part) for transferring the toner image onto the intermediate transfer belt 86, a photoconductor-body cleaning member 84 for removing toner, foreign particles, and the like adhering to the photoconductor body 79, a second transfer roller 75 (second transfer part) for transferring the toner image on the intermediate transfer belt 86 onto a recording medium, and the fixing device 72 (fixing part) for fixing the toner image on the recording medium. As illustrated in FIG. 3, the first transfer roller 80 may be disposed immediately above the photoconductor body 79. Alternatively, the first transfer roller 80 may be disposed at a position displaced with respect to the position immediately above the photoconductor body 79.

The configuration of the image forming apparatus 101 illustrated in FIG. 3 will be described further in detail.

In the image forming apparatus 101, the charging roller 83, the developing device 85, the first transfer roller 80 disposed beyond the intermediate transfer belt 86, and the photoconductor-body cleaning member 84 are disposed counterclockwise around the photoconductor body 79. Such members constitute a developing unit corresponding to a single color. A toner cartridge 71 for supplying a developer to the developing device 85 is provided for each developing unit. The laser generating device 78 is disposed for the photoconductor bodies 79 of the developing units. The laser generating device 78 irradiates a surface portion of each photoconductor body 79 with laser light in accordance with image information, the surface portion being downstream of the charging roller 83 (in the direction in which the photoconductor body 79 is rotated) and upstream of the developing device 85.

Four developing units corresponding to four colors (for example, cyan, magenta, yellow, and black) are horizontally arranged in a line in the image forming apparatus 101. The intermediate transfer belt 86 is disposed so as to be passed through transfer regions between the photoconductor bodies 79 and the first transfer rollers 80 of the four developing units. The intermediate transfer belt 86 is supported so as to be stretched by a support roller 73, a support roller 74, and a driving roller 81 that are sequentially disposed counterclockwise inside the intermediate transfer belt 86. Thus, a belt stretching device 90 is provided. The four first transfer rollers 80 are disposed downstream of the support roller 73 (in the direction in which the intermediate transfer belt 86 is rotated) and upstream of the support roller 74. A transfer cleaning member 82 for cleaning the outer peripheral surface of the intermediate transfer belt 86 is disposed opposite the driving roller 81 through the intermediate transfer belt 86 so as to be in contact with the driving roller 81.

The second transfer roller 75 for transferring a toner image formed on the outer peripheral surface of the intermediate transfer belt 86 onto a surface of a recording paper sheet transported from a paper sheet supplying section 77 through a paper sheet path 76 is disposed opposite the support roller 73 through the intermediate transfer belt 86 so as to be in contact with the support roller 73.

The paper sheet supplying section 77 that contains recording media is provided in a bottom portion of the image forming apparatus 101. A recording medium is supplied from the paper sheet supplying section 77 so as to be passed through the paper sheet path 76 and the nip between the support roller 73 and the second transfer roller 75 that constitute a second transfer unit. The recording medium having been passed through the nip is further transported by a transport part (not shown) so as to be passed through the nip of the fixing device 72. Finally, the recording medium is discharged from the image forming apparatus 101.

Hereinafter, a method for forming an image by using the image forming apparatus 101 illustrated in FIG. 3 will be described. The formation of a toner image is performed in each developing unit. The surface of the photoconductor body 79 being rotated counterclockwise is charged with the charging roller 83. Then, a latent image (electrostatic latent image) is formed on the charged surface of the photoconductor body 79 by using the laser generating device 78 (exposure device). Then, the latent image is developed with a developer supplied from the developing device 85 to form a toner image. The toner image having been transported to the nip between the first transfer roller 80 and the photoconductor body 79 is transferred onto the outer peripheral surface of the intermediate transfer belt 86 being rotated in the direction represented by arrow C. The photoconductor body 79 after the transfer of a toner image is subjected to cleaning of toner, foreign particles, and the like adhering to the surface of the photoconductor body 79 by using the photoconductor-body cleaning member 84. Thus, the photoconductor body 79 is prepared for the next formation of a toner image.

The toner images developed by the developing units corresponding to colors are sequentially stacked on the outer peripheral surface of the intermediate transfer belt 86 so as to correspond to image information. The thus-stacked toner images are transported to a second transfer unit and transferred by the second transfer roller 75 onto a surface of a recording paper sheet having been transported from the paper sheet supplying section 77 through the paper sheet path 76. The recording paper sheet onto which the toner images have been transferred is then pressed and heated when the recording paper sheet is passed through the nip of the fixing device 72. As a result, the toner images are fixed to form an image on the surface of the recording medium. Then, the recording medium is discharged from the image forming apparatus.

Fixing Device (Image Fixing Device)

FIG. 4 is a schematic view of the configuration of the fixing device 72 installed in the image forming apparatus 101 according to an exemplary embodiment. The fixing device 72 illustrated in FIG. 4 includes the fixing roller 610 serving as a rotational body that is driven so as to rotate, an endless belt 620 (pressure belt), and a pressure pad 640 serving as a pressing member configured to press the fixing roller 610 through the endless belt 620. It will suffice that the pressure pad 640 press the endless belt 620 and the fixing roller 610 toward each other. Accordingly, the endless belt 620 may be pressed by the fixing roller 610 or the fixing roller 610 may be pressed by the endless belt 620.

The halogen lamp 660 serving as an example of a heating part for heating unfixed toner images in a nipping region is disposed inside the fixing roller 610. The heating part is not restricted to a halogen lamp and another heating member generating heat may be used.

The thermo-sensitive device 690 is disposed on the surface of the fixing roller 610 so as to be in contact with the fixing roller 610. Turning on of the halogen lamp 660 is controlled on the basis of temperature values measured with the thereto-sensitive device 690 to maintain the surface temperature of the fixing roller 610 to be a specified temperature (for example, 150° C.)

The endless belt 620 is rotatably supported by the pressure pad 640, a belt running guide 630, and an edge guide (not shown), the pressure pad 640 and the belt running guide 630 being disposed inside the endless belt 620. In a nipping region N, the endless belt 620 is disposed under pressure so as to be in contact with the fixing roller 610.

The pressure pad 640 is disposed inside the endless belt 620 so as to press the fixing roller 610 through the endless belt 620. Thus, the pressure pad 640 and the fixing roller 610 form the nipping region N therebetween. In the pressure pad 640, a pre-nipping member 641 for providing a wide nipping region N is disposed on the entrance side of the nipping region N and a peeling nipping member 642 for distorting the fixing roller 610 is disposed on the exit side of the nipping region N.

To decrease the sliding resistance between the inner circumferential surface of the endless belt 620 and the pressure pad 640, a low-friction sheet 680 is disposed on the surfaces of the pre-nipping member 641 and the peeling nipping member 642, the surfaces being in contact with the endless belt 620. The pressure pad 640 and the low-friction sheet 680 are held by a metal holder 650.

The holder 650 is equipped with the belt running guide 630 so that the endless belt 620 is rotated smoothly. Specifically, since the inner circumferential surface of the endless belt 620 slides against the belt running guide 630, the belt running guide 630 is composed of a material having a low coefficient of static friction. In addition, the material of the belt running guide 630 has a low thermal conductivity such that the belt running guide 630 is less likely to deprive the endless belt 620 of heat.

The fixing roller 610 is rotated in the direction represented by arrow C by a driving motor (not shown). Such rotation drives the endless belt 620 in a direction opposite to the direction in which the fixing roller 610 is rotated. That is, the fixing roller 610 is rotated clockwise in FIG. 4, whereas the endless belt 620 is rotated counterclockwise.

A paper sheet K including unfixed toner images is guided by a fixing entrance guide 560 and transported to the nipping region N. When the paper sheet K is then passed through the nipping region N, the toner images on the paper sheet K are fixed by pressure applied to the nipping region N and heat supplied by the fixing roller 610.

In the fixing device 72, the pre-nipping member 641 having a recess conforming to the outer circumferential surface of the fixing roller 610 provides the nipping region N.

In the fixing device 72 according to an exemplary embodiment, by disposing the peeling nipping member 642 so as to project toward the outer circumferential surface of the fixing roller 610, the distortion of the fixing roller 610 is locally made large in the exit region of the nipping region N. In such a configuration, after fixing, the paper sheet K is peeled from the fixing roller 610.

A peeling member 700 serving as a peeling auxiliary part is disposed downstream of the nipping region N, for the fixing roller 610. In the peeling member 700, a peeling baffle 710 is held in a direction (counter direction) intersecting the direction in which the fixing roller 610 is rotated, by a holder 720 so as to be in close proximity to the fixing roller 610.

Hereinafter, members other than the endless belt 620 and the fixing roller 610 in the fixing device 72 according to an exemplary embodiment will be described in detail.

As described above, the pressure pad 640 disposed inside the endless belt 620 includes the pre-nipping member 641 and the peeling nipping member 642. The pressure pad 640 is supported by the holder 650 such that a spring or an elastic body presses the fixing roller 610 with a load of, for example, 32 kgf. A surface of the pressure pad 640, the surface facing the fixing roller 610, is formed so as to have a recessed curve conforming to the outer circumferential surface of the fixing roller 610. The pre-nipping member 641 and the peeling nipping member 642 may be composed of a material having heat resistance.

The shape and the material of the pressure pad 640 disposed inside the endless belt 620 are not particularly restricted as long as the pressure pad 640 functions to press the fixing roller 610 through the endless belt 620 and to form the nipping region N through which a paper sheet K including an unfixed toner image is passed between the endless belt 620 and the fixing roller 610. In addition to the pressure pad 640, for example, a pressure roller configured to press the fixing roller 610 while being rotated may also be disposed.

As for the pre-nipping member 641, a heat resistant elastomer such as a silicone rubber or a fluoro rubber or an elastic body such as a leaf spring is used. Of such materials, silicone rubber is preferred in view of excellent elasticity. Examples of such a silicone rubber include RTV silicone rubbers and HTV silicone rubbers. Specific examples of such silicone rubbers include polydimethyl silicone rubber (MQ), methyl vinyl silicone rubber (VMQ), methyl phenyl silicone rubber (PMQ), and fluoro silicone rubber (FVMQ). A silicone rubber having a JIS-A hardness of 10° to 40° is preferably used in view of hardness. The shape, structure, size, and the like of such an elastic body are not particularly restricted and are selected in accordance with a purpose. In the fixing device 72 according to an exemplary embodiment, a silicone rubber member having a width of 10 mm, a thickness of 5 mm, and a length of 320 mm is used.

The peeling nipping member 642 is composed of a heat resistant resin such as PPS (polyphenylene sulfide), polyimide, polyester, or polyamide; or a metal such as iron, aluminum, or SUS. As for the shape of the peeling nipping member 642, the peeling nipping member 642 is formed so as to have an outer shape in the nipping region N, the outer shape being a convex curved surface having a certain radius of curvature. In the fixing device 72 according to an exemplary embodiment, the endless belt 620 is wrapped around the fixing roller 610 at a wrapping angle of 40° by using the pressure pad to form the nipping region N having a width of 8 mm.

The low-friction sheet 680 is disposed in order to decrease the sliding resistance (frictional resistance) between the inner circumferential surface of the endless belt 620 and the pressure pad 640. For the low-friction sheet 680, a material having a low coefficient of friction and being excellent in terms of wear resistance and heat resistance is suitably used.

Examples of a material for the low-friction sheet 680 include various materials such as metals, ceramics, and resins. Specific examples of such materials include heat resistant resins such as fluorocarbon resins, polyether sulfone (PES), polybutylene terephthalate (PET), liquid crystal polymers (LOP), polyphenylene sulfide (PPS), and polyethylene terephthalate (PET); natural materials of 6-nylon and natural materials of 6,6-nylon; and materials in which carbon, glass fiber, or the like is added to the foregoing materials.

In particular, a fluorocarbon resin sheet in which a surface being in contact with the endless belt 620 has a low sliding resistance against the inner circumferential surface of the endless belt 620 and a surface on which lubricant is held has micro-irregularities is preferred.

Specifically, for example, a PTFE resin sheet formed by sintering, a glass fiber sheet impregnated with Teflon (registered trademark), a laminate sheet in which a skived film sheet composed of a fluorocarbon resin is sandwiched by heat sealing between glass fiber sheets, or a fluorocarbon resin sheet in which streak-shaped irregularities are formed is used.

The low-friction sheet 680 may be formed as an independent member separate from the pre-nipping member 641 and the peeling nipping member 642. Alternatively, the low-friction sheet 680 may be integrally formed together with the pre-nipping member 641 and the peeling nipping member 642.

A lubricant applying member 670 is also disposed in the holder 650 so as to extend in the longitudinal direction of the fixing device 72. The lubricant applying member 670 is disposed so as to be in contact with the inner circumferential surface of the endless belt 620 and supplies an appropriate amount of a lubricant to the endless belt 620. Thus, the lubricant is supplied to the portion where the endless belt 620 slides against the low-friction sheet 680 and the sliding resistance between the endless belt 620 and the pressure pad 640 through the low-friction sheet 680 is further decreased. In this way, smooth rotation of the endless belt 620 is achieved. The lubricant applying member 670 also provides an effect of suppressing wear of the inner circumferential surface of the endless belt 620 and the surface of the low-friction sheet 680.

Such a lubricant may be a silicone oil. An example of such a silicone oil is a dimethyl silicone oil, an organometallic-salt-added dimethyl silicone oil, a hindered-amine-added dimethyl silicone oil, an organometallic-salt-and-hindered-amine-added dimethyl silicone oil, a methylphenyl silicone oil, an amino-modified silicone oil, an organometallic-salt-added amino-modified silicone oil, a hindered-amine-added amino-modified silicone oil, a carboxy-modified silicone oil, a silanol-modified silicone oil, a sulfonic-acid-modified silicone oil, or the like. Of these, an amino-modified silicone oil, which has excellent wettability, is preferably used.

In the image fixing device 72 according to an exemplary embodiment, the lubricant applying member 670 is used to supply a lubricant to the inner circumferential surface of the endless belt 620. Alternatively, a configuration in which a lubricant applying member and a lubricant are not used may be employed.

A methylphenyl silicone oil, a fluorocarbon oil (a perfluoropolyether oil or a modified perfluoropolyether oil), or the like is suitably used. An anti-oxidizing agent may be added to a silicone oil. A synthetic lubricant oil grease in which a solid substance and a liquid are mixed together such as a silicone grease, a fluorocarbon grease, or a combination of such greases may be used. In the fixing device 72 according to an exemplary embodiment, an amino-modified silicone oil having a viscosity of 300 cs (KF96 manufactured by Shin-Etsu Chemical Co., Ltd.) is used.

As described above, the inner circumferential surface of the endless belt 620 slides against the belt running guide 630. Thus, the belt running guide 630 may be composed of a material having a low coefficient of friction and a low thermal conductivity such that the belt running guide 630 is less likely to deprive the endless belt 620 of heat. Accordingly, a heat resistant resin such as PFA or PPS is used.

In the image forming apparatus 101 according to an exemplary embodiment, an endless belt according to the above-described exemplary embodiment is used as the endless belt 620 of the fixing device 72. However, an endless belt according to the above-described exemplary embodiment may be used as the intermediate transfer belt 86.

Second Exemplary Embodiment

An image forming apparatus according to a second exemplary embodiment has a configuration in which, instead of the fixing device 72 disposed in the image forming apparatus 101 according to the first exemplary embodiment, a fixing device including a fixing belt including a heating source (the fixing belt being an endless belt according to an exemplary embodiment) and a pressure roller (a roller according to an exemplary embodiment) is used. Since the second exemplary embodiment is the same as the first exemplary embodiment except that the different fixing device is used, descriptions of the common features are omitted.

Fixing Device (Image Fixing Device)

Figure 5:
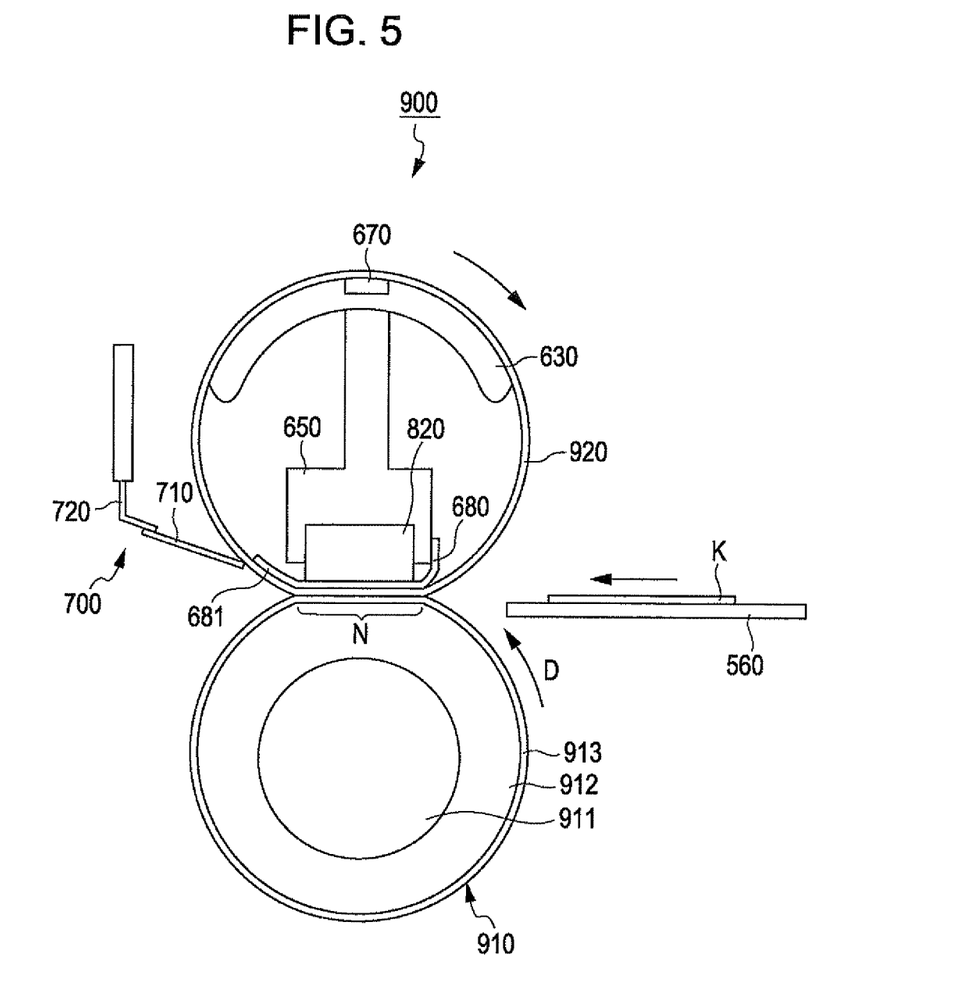
FIG. 5 is a schematic view illustrating the configuration of an image fixing device including an endless belt according to another exemplary embodiment.

FIG. 5 is a schematic view of the configuration of a fixing device according to the second exemplary embodiment. Specifically, FIG. 5 illustrates a fixing device including an endless belt according to an exemplary embodiment serving as a fixing belt and a roller according to an exemplary embodiment serving as a pressure roller. Components similar to those in the fixing device according to the first exemplary embodiment are denoted with the same reference numerals and detailed descriptions of such components are omitted.

As illustrated in FIG. 5, a fixing device 900 according to the second exemplary embodiment includes a fixing belt 920, which is an endless belt, and a pressure roller 910 serving as an example of a rotational body that is driven so as to rotate. The fixing belt 920 has the same configuration as the above-described endless belt 620.

The fixing belt 920 is disposed so as to face a surface of the paper sheet K, the surface holding a toner image. A ceramic heater 820 that is a heating resistor serving as an example of a heating part is disposed inside the fixing belt 920. The ceramic heater 820 is configured to supply heat to the nipping region N.

As for the ceramic heater 820, a surface facing the pressure roller 910 is formed so as to be flat. The ceramic heater 820 is disposed so as to press the pressure roller 910 through the fixing belt 920 to form the nipping region N. Thus, the ceramic heater 820 also functions as a pressing member. The paper sheet K having been passed through the nipping region N is peeled from the fixing belt 920 in the exit region (peeling nipping region) of the nipping region N due to change in the curvature of the fixing belt 920.

To decrease the sliding resistance between the inner circumferential surface of the fixing belt 920 and the ceramic heater 820, a low-friction sheet 680 is disposed between the inner circumferential surface of the fixing belt 920 and the ceramic heater 820. The low-friction sheet 680 may be formed as an independent member separate from the ceramic heater 820. Alternatively, the low-friction sheet 680 may be integrally formed together with the ceramic heater 820.

The pressure roller 910 is disposed so as to face the fixing belt 920. The pressure roller 910 is rotated in the direction represented by arrow D by a driving motor (not shown). Such rotation causes the fixing belt 920 to rotate. The pressure roller 910 includes a stack of a core (cylindrical metal member) 911, a heat-resistant elastic layer 912 covering the outer circumferential surface of the core 911, and a release layer 913 that is a heat-resistant resin coating or a heat-resistant rubber coating. If necessary, each layer is made semiconductive by addition of carbon black or the like thereto to address offsetting of toner.

The peeling member 700 serving as a peeling auxiliary part may be disposed downstream of the nipping region N, for the fixing belt 920. In the peeling member 700, the peeling baffle 710 is held in a direction (counter direction) intersecting the direction in which the fixing belt 920 is rotated, by the holder 720 so as to be in close proximity to the fixing belt 920.

The paper sheet K including unfixed toner images is guided by the fixing entrance guide 560 and transported to the nipping region N of the fixing device 900. When the paper sheet K is passed through the nipping region N, the toner images on the paper sheet K are fixed by pressure applied to the nipping region N and heat supplied by the ceramic heater 820 disposed on the fixing belt 920 side of the fixing device 900.

Here, in the fixing device 900 according to an exemplary embodiment, the pressure roller 910 is formed so as to have a reverse crown shape (flaring shape) in which the outer diameters of the two end portions are larger than the outer diameter of the central portion. The fixing belt 920 has an irregularly shaped structure in the inner surface. This irregularly shaped structure is configured to deform in the nipping region so as to expand in conformity to the surface shape of the pressure roller 910. In such a configuration, when a paper sheet is passed through the nipping region, a tensile force is applied by the pressure roller 910 in the width direction from the central portion to the two end portions of the paper sheet. Thus, the paper sheet is stretched and the length of the fixing belt 920 in the surface width direction is increased.

Accordingly, in the fixing device 900 according to an exemplary embodiment, slipping of the fixing belt 920 against the paper sheet K is suppressed in the entire region from the central portion to the two end portions of the fixing belt 920.

As for the heating source, other than the ceramic heater 820, a halogen lamp disposed inside the fixing belt 920 or an electromagnetic induction coil that is disposed inside or outside of the fixing belt 920 and generates heat by electromagnetic induction may be used.

In addition to the flat pressure member, for example, a pressure roller configured to press the pressure roller 910 while being rotated may also be disposed inside the fixing belt 920.

Third Exemplary Embodiment

Hereinafter, an image forming apparatus according to a third exemplary embodiment including an endless belt according to an exemplary embodiment serving as a paper-sheet transport belt will be described.

Figure 6:
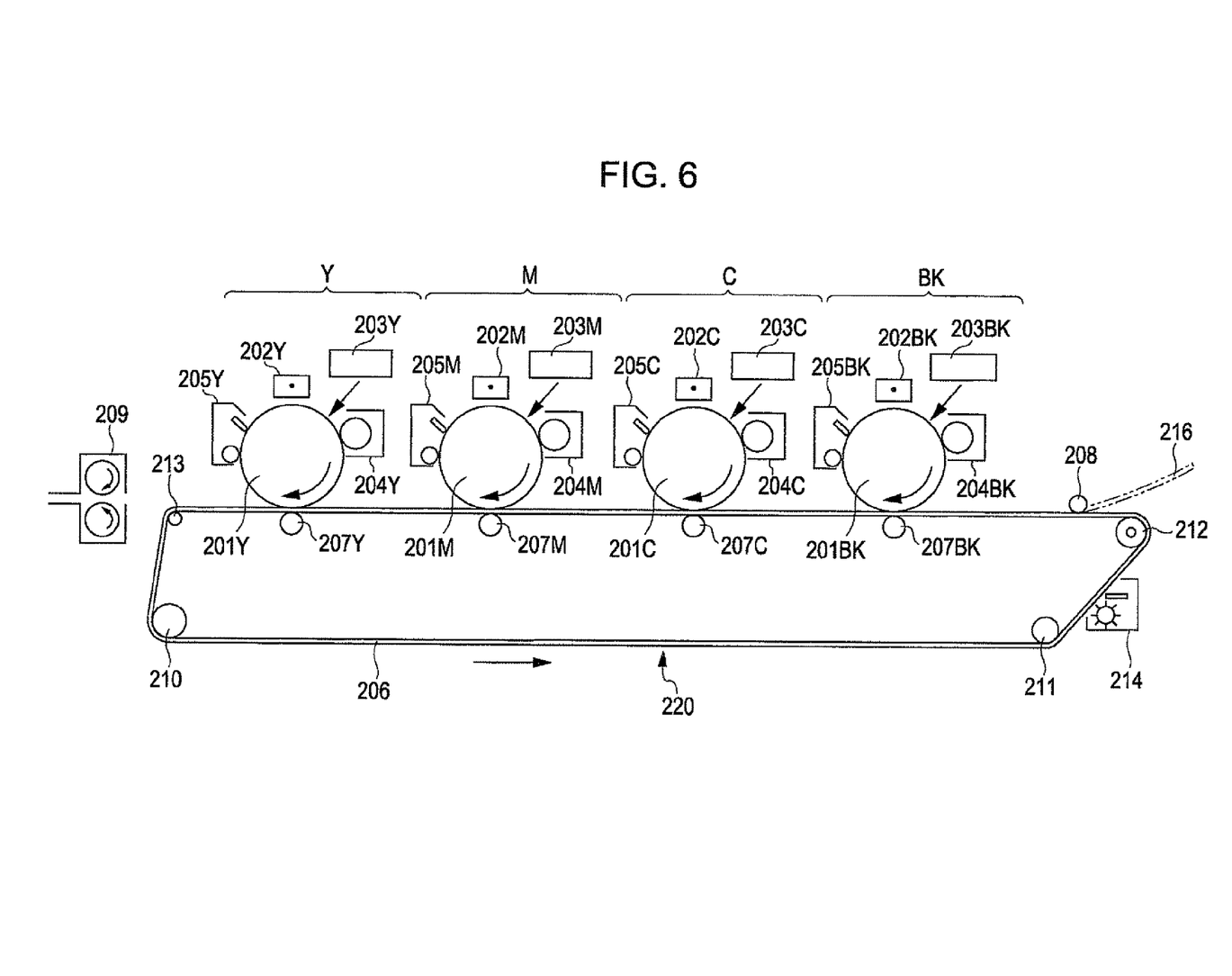
FIG. 6 is a schematic view illustrating the configuration of an image forming apparatus including an endless belt according to an exemplary embodiment, the endless belt serving as a paper-sheet transport belt.

FIG. 6 is a schematic view illustrating an image forming apparatus according to the third exemplary embodiment. In the image forming apparatus illustrated in FIG. 6, units Y, M, C, and BK respectively include photoconductor drums 201Y, 201M, 201C, and 201BK that are configured to rotate in the clockwise directions indicated by arrows. In the proximity of the photoconductor drums 201Y, 201M, 201C, and 201BK, charging devices 202Y, 202M, 202C, and 202BK, exposing devices 203Y, 203M, 203C, and 203BK, developing devices corresponding to colors (yellow developing device 204Y, magenta developing device 204M, cyan developing device 204O, and black developing device 204BK), and photoconductor-drum cleaning members 205Y, 205M, 205C, and 205BK are respectively disposed.

The units Y, M, C, and BK are arranged in parallel with a paper-sheet transport belt 206 in the sequence of the units BK, C, M, and Y. However, for example, the sequence of the units BK, Y, C, and M may be set to an appropriate sequence in accordance with an image forming method.

The paper-sheet transport belt 206 is supported so as to be stretched by belt support rollers 210, 211, 212, and 213 disposed inside the paper-sheet transport belt 206. Thus, a belt stretching device 220 for the image forming apparatus is provided. The paper-sheet transport belt 206 is configured to be rotated in a counterclockwise direction indicated by arrow at the same peripheral velocity as that of the photoconductor drums 201Y, 201M, 201C, and 201BK. The paper-sheet transport belt 206 is disposed such that a portion of the paper-sheet transport belt 206, the portion being between the belt support rollers 212 and 213, is in contact with the photoconductor drums 201Y, 201M, 201C, and 201BK. A belt cleaning member 214 is provided for the paper-sheet transport belt 206.

Transfer rollers 207Y, 207M, 207C, and 207BK are respectively disposed inside the paper-sheet transport belt 206 and at positions so as to face positions where the paper-sheet transport belt 206 and the photoconductor drums 201Y, 201M, 201C, and 201BK are in contact with each other. Thus, the transfer rollers 207Y, 207M, 207C, and 207BK, the photoconductor drums 201Y, 201M, 201C, and 201BK, and the paper-sheet transport belt 206 form transfer regions where toner images are transferred onto a paper sheet (receiver) 216. As illustrated in FIG. 6, the transfer rollers 207Y, 207M, 207C, and 207BK may be respectively disposed immediately below the photoconductor drums 201Y, 201M, 201C, and 201BK. Alternatively, the transfer rollers 207Y, 207M, 207C, and 207BK may be respectively disposed at positions displaced with respect to the positions immediately below the photoconductor drums 201Y, 201M, 201C, and 201BK.

A fixing device 209 is disposed such that the paper sheet is transported to the fixing device 209 after the paper sheet is passed through the transfer regions formed between the paper-sheet transport belt 206 and the photoconductor drums 201Y, 201M, 201C, and 201BK.

The paper sheet 216 is transported to the paper-sheet transport belt 206 by a paper-sheet transport roller 208.

In the image forming apparatus according to the third exemplary embodiment illustrated in FIG. 6, in the unit BK, the photoconductor drum 201BK is driven so as to be rotated. Such rotation operatively drives the charging device 202BK and the charging device 202BK charges the surface of the photoconductor drum 201BK such that the surface has an intended polarity and potential. The photoconductor drum 201BK whose surface is thus charged is then subjected to image exposure by using the exposing device 203BK. Thus, an electrostatic latent image is formed on the surface of the photoconductor drum 201BK.

Then, the electrostatic latent image is developed with the black developing device 204BK. Thus, a toner image is formed on the surface of the photoconductor drum 201BK. A developer used at this time may be a single component developer or a two component developer.

The thus-formed toner image is passed through the transfer region formed between the photoconductor drum 201BK and the paper-sheet transport belt 206. The paper sheet 216 is electrostatically attracted to the paper-sheet transport belt 206 and transported to the transfer region. The toner image is sequentially transferred onto a surface of the paper sheet 216 by an electric field formed by a transfer bias applied from the transfer roller 207BK.

After that, toner remaining on the photoconductor drum 201BK is cleaned and removed by the photoconductor-drum cleaning member 205BK. Thus, the photoconductor drum 201BK is prepared for the next image transfer.

The above-described image transfer is also performed in the units C, M, and Y in the above-described manner.

The paper sheet 216 onto which toner images have been transferred by the transfer rollers 207BK, 207C, 207M, and 207Y is then transported to the fixing device 209 and the toner images are fixed on the paper sheet 216.

As a result, an intended image is formed on the paper sheet.

EXAMPLES

Hereinafter, exemplary embodiments according to the present invention will be described in detail with reference to examples. However, the present invention is not restricted to the examples described below. In the following description, "parts" and "%" are based on mass unless otherwise specified.

Sample Preparation Method

Example 1

Synthesis of Acrylic Resin Prepolymer A1

A monomer solution composed of 286.8 parts of hydroxyethyl methacrylate (HEMA, the number of carbon atoms in a side chain containing a hydroxyl group: 3) serving as monomers providing short side chain hydroxyl groups, 313.2 parts of butyl methacrylate (BMA), 27 parts of a polymerization initiator (benzoyl peroxide, BPO), and 60 parts of butyl acetate was charged into a dropping funnel and dropped into 300 parts of butyl acetate that was heated to 110° C. and being stirred over three hours under nitrogen flow to polymerize the monomers. Furthermore, a solution composed of 135 parts of butyl acetate and 3 parts of BPO was dropped to this reaction solution over an hour to complete the reaction. The reaction solution was always maintained at 110° C. and being stirred during the reaction. As a result, an acrylic resin prepolymer A1 not containing long side chain hydroxyl groups was synthesized.

Formation of Resin Layer Sample A1

The following solutions A and B were mixed together in the following proportions and the following solution C was further added thereto. The resultant mixture was defoamed for 10 minutes under a reduced pressure. The thus-prepared solution was cast onto a polyimide film having a thickness of 90 μm and cured at 85° C. for an hour and at 130° C. for 30 minutes. Thus, a resin layer sample A1 having a thickness of 40 μm was obtained.

Solution A (solution of the above-described acrylic resin prepolymer A1, 44.2%, hydroxyl value: 206): 113 parts Solution B (polyol, manufactured by DAICEL CHEMICAL INDUSTRIES, LTD., PLACCEL 208, polycaprolactonediol, hydroxyl value: 138, hydroxyl groups are connected to each other through a chain containing about 42 carbon atoms): 149.6 parts Solution C (isocyanate, manufactured by Asahi Kasei Chemicals Corporation, Duranate TKA100, compound name: hexamethylene diisocyanate-based polyisocyanurate): 138.2 parts The total molar amount (A) of the hydroxyl groups of the acrylic resin prepolymer in the solution A was 0.184 mol. The total molar amount (B) of the hydroxyl groups of the polyol in the solution B was 0.37 mol. Thus, the ratio (B/A) was 2.

Example 2

A resin layer sample A2 was obtained in the same manner as in Example 1 except that the amount of the solution B was changed to 14.96 parts and the amount of the solution C was changed to 55.28 parts in "Formation of resin layer sample A1" in Example 1. The total molar amount (A) of the hydroxyl groups of the acrylic resin prepolymer in the solution A was 0.184 mol. The total molar amount (B) of the hydroxyl groups of the polyol in the solution B was 0.037 mol. Thus, the ratio (B/A) was 0.2.

Example 3

A resin layer sample A3 was obtained in the same manner as in Example 1 except that the amount of the solution B was changed to 374.0 parts and the amount of the solution C was changed to 276.4 parts in "Formation of resin layer sample A1" in Example 1. The total molar amount (A) of the hydroxyl groups of the acrylic resin prepolymer in the solution A was 0.184 mol. The total molar amount (B) of the hydroxyl groups of the polyol in the solution B was 0.92 mol. Thus, the ratio (B/A) was 5.

Example 4

An acrylic resin prepolymer A4 was synthesized in the same manner as in Example 1 except that, in "Synthesis of acrylic resin prepolymer A1" in Example 1, instead of 286.8 parts of hydroxyethyl methacrylate (HEMA), 228.8 parts of hydroxyethyl methacrylate (HEMA) and 207.7 parts of PLACCEL FM3 (manufactured by DAICEL CHEMICAL INDUSTRIES, LTD., compound name: lactone-modified methacrylate, the number of carbon atoms in a side chain containing a hydroxyl group: 21) were used.

A resin layer sample A4 was obtained in the same manner as in Example 1 except that, in "Formation of resin layer sample A1" in Example 1, 112 parts of the solution of the above-described acrylic resin prepolymer A4 (44.6%, hydroxyl value: 165) was used instead of 113 parts of the solution of the acrylic resin prepolymer A1, the amount of the solution B (PLACCEL 208, hydroxyl value: 138) was changed to 119.8 parts, and the amount of the solution C (Duranate TKA100) was changed to 110.69 parts.

The total molar amount (A) of the hydroxyl groups of the acrylic resin prepolymer in the solution A was 0.147 mol. The total molar amount (B) of the hydroxyl groups of the polyol in the solution B was 0.295 mol. Thus, the ratio (B/A) was 2.

Example 5

An acrylic resin prepolymer A5 was synthesized in the same manner as in Example 1 except that, in "Synthesis of acrylic resin prepolymer A1" in Example 1, instead of 286.8 parts of hydroxyethyl methacrylate (HEMA), 228.8 parts of hydroxyethyl methacrylate (HEMA) and 207.7 parts of PLACCEL FM3 (manufactured by DAICEL CHEMICAL INDUSTRIES, LTD., compound name: lactone-modified methacrylate, the number of carbon atoms in a side chain containing a hydroxyl group: 21) were used; and, instead of 313.2 parts of butyl methacrylate (BMA), 950.4 parts of CHEMINOX FAMAC6 (manufactured by UNIMATEC CO., LTD., compound name: 2-(perfluorohexyl)ethyl methacrylate, which contains fluorine atoms) were used.

A resin layer sample A5 was obtained in the same manner as in Example 1 except that, in "Formation of resin layer sample A1" in Example 1, 113.6 parts of the solution of the above-described acrylic resin prepolymer A5 (44.0%, hydroxyl value: 89) was used instead of 113 parts of the solution of the acrylic resin prepolymer A1, the amount of the solution B (PLACCEL 208, hydroxyl value: 138) was changed to 64.6 parts, and the amount of the solution C (Duranate TKA100) was changed to 59.7 parts.

The total molar amount (A) of the hydroxyl groups of the acrylic resin prepolymer in the solution A was 0.08 mol. The total molar amount (B) of the hydroxyl groups of the polyol in the solution B was 0.16 mol. Thus, the ratio (B/A) was 2.

Example 6

A resin layer sample A6 was obtained in the same manner as in Example 5 except that, in the formation of the resin layer sample A5 in Example 5, instead of 64.6 parts of the solution B (polyol, manufactured by DAICEL CHEMICAL INDUSTRIES, LTD., PLACCEL 208, polycaprolactonediol), 44.7 parts of C10DIOL (fluorine-atom-containing polyol, manufactured by Exfluor Research Corporation, hydroxyl value: 199, hydroxyl groups are connected to each other through a chain containing 10 carbon atoms) were used.

The total molar amount (A) of the hydroxyl groups of the acrylic resin prepolymer in the solution A was 0.08 mol. The total molar amount (B) of the hydroxyl groups of the polyol in the solution B was 0.16 mol. Thus, the ratio (B/A) was 2.

Comparative Example 1

A resin layer sample B1 was obtained in the same manner as in Example 1 except that, in "Formation of resin layer sample A1" in Example 1, the amount of the solution B was changed to 3.74 parts and the amount of the solution C was changed to 48.37 parts. The total molar amount (A) of the hydroxyl groups of the acrylic resin prepolymer in the solution A was 0.184 mol. The total molar amount (B) of the hydroxyl groups of the polyol in the solution B was 0.009 mol. Thus, the ratio (B/A) was 0.05.

Comparative Example 2

A resin layer sample B2 was obtained in the same manner as in Example 1 except that, in "Formation of resin layer sample A1" in Example 1, the amount of the solution B was changed to 1116 parts and the amount of the solution C was changed to 734 parts. The total molar amount (A) of the hydroxyl groups of the acrylic resin prepolymer in the solution A was 0.184 mol. The total molar amount (B) of the hydroxyl groups of the polyol in the solution B was 2.75 mol. Thus, the ratio (B/A) was 15.

Comparative Example 3

Synthesis of Acrylic Resin Prepolymer B3

A monomer solution composed of 91.0 parts of hydroxyethyl methacrylate (HEMA, the number of carbon atoms in a side chain containing a hydroxyl group: 3) serving as monomers providing short side chain hydroxyl groups, 660.8 parts of PLACCEL FM3 (manufactured by DAICEL CHEMICAL INDUSTRIES, LTD., compound name: lactone-modified methacrylate, the number of carbon atoms in a side chain containing a hydroxyl group: 21), 488.4 parts of isobornyl methacrylate (IBMA), 27 parts of a polymerization initiator (benzoyl peroxide, BPO), and 60 parts of butyl acetate was charged into a dropping funnel and dropped into 300 parts of butyl acetate that was heated to 110° C. and being stirred over three hours under nitrogen flow to polymerize the monomers. Furthermore, a solution composed of 135 parts of butyl acetate and 3 parts of BPO was dropped to this reaction solution over an hour to complete the reaction. The reaction solution was always maintained at 110° C. and being stirred during the reaction. As a result, an acrylic resin prepolymer B3 was synthesized. The content ratio (molar ratio) of long side chain hydroxyl groups to short side chain hydroxyl groups was 2.

Formation of Resin Layer Sample B3

The following solution C was added to the following solution A. The resultant mixture was defoamed for 10 minutes under a reduced pressure. The thus-prepared solution was cast onto a polyimide film having a thickness of 90 µm and cured at 85° C. for an hour and at 130° C. for 30 minutes. Thus, a resin layer sample B3 having a thickness of 40 µm was obtained.

Solution A (solution of the above-described acrylic resin prepolymer B3, 45.2%, hydroxyl value: 97): 110.5 parts Solution C (isocyanate, manufactured by Asahi Kasei Chemicals Corporation, Duranate TKA100, compound name: hexamethylene diisocyanate-based polyisocyanurate): 21.7 parts

Comparative Example 4

A resin layer sample B4 for a protective layer was obtained in the same manner as in Example 1 except that, in "Formation of resin layer sample A1" in Example 1, instead of 149.6 parts of the solution B (polyol, manufactured by DAICEL CHEMICAL INDUSTRIES, LTD., PLACCEL 208, polycaprolactonediol, hydroxyl groups are connected to each other through a chain containing about 42 carbon atoms), 1.15 parts of ethylene diol (hydroxyl value: 1806, hydroxyl groups are connected to each other through a chain containing 2 carbon atoms) were used. The total molar amount (A) of the hydroxyl groups of the acrylic resin prepolymer in the solution A was 0.184 mol. The total molar amount (B) of the hydroxyl groups of the polyol in the solution B was 0.037 mol. Thus, the ratio (B/A) was 0.2.

Comparative Example 5

An acrylic resin prepolymer B5 was synthesized in the same manner as in Example 5 except that, in the synthesis of the acrylic resin prepolymer A5 in Example 5, the amount of hydroxyethyl methacrylate (HEMA) was changed from 228.8 parts to 95.3 parts and the amount of PLACCEL FM3 (manufactured by DAICEL CHEMICAL INDUSTRIES, LTD.) was changed from 207.7 parts to 692.3 parts; and, as in the synthesis of the acrylic resin prepolymer A5, CHEMINOX FAMAC6 (manufactured by UNIMATEC CO., LTD., compound name: 2-(perfluorohexyl)ethyl methacrylate, which contains fluorine atoms) was used instead of butyl methacrylate (BMA). The content ratio (molar ratio) of long side chain hydroxyl groups to short side chain hydroxyl groups was 2.

A resin layer sample B5 was obtained in the same manner as in Comparative example 3 except that, in "Formation of resin layer sample B3" in Comparative example 3, instead of 110.5 parts of the solution of the acrylic resin prepolymer B3, 111.2 parts of a solution of the above-described acrylic resin prepolymer B5 (44.9%, hydroxyl value: 71) were used; and the amount of the solution C was changed from 21.7 parts to 15.1 parts.

Evaluation

The resin layer samples in Examples and Comparative examples were measured in terms of elastic modulus, recovery proportion, Martens hardness, and dynamic contact angle (advancing contact angle). The results are summarized in Table 1 below.

A FISCHERSCOPE HM2000 (manufactured by Fischer Instruments K.K.) was used as a measurement apparatus. Each resin layer sample formed by applying a resin to a polyimide film and polymerizing the resin was fixed on a slide glass with an adhesive agent and placed in the measurement apparatus. The resin layer sample was subjected to an increasing load up to 0.5 mN over 15 seconds at room temperature (23° C.) and the resin layer sample was held under the load of 0.5 mN for 5 seconds. At this time, the maximum displacement of the resin layer sample was defined as h1. After that, the load was decreased to 0.005 mN over 15 seconds and the resin layer sample was held under the load of 0.005 mN for a minute. At this time, the displacement of the resin layer sample was defined as h2. The recovery proportion [(h1−h2)/h1] was then calculated. In addition, the Martens hardness and the elastic modulus were determined from a load displacement curve obtained at this time.

Scratching Resistance Test

The resin layer samples obtained above were evaluated in terms of resistance to scratching by the following method.

Each of the polyimide films on which the resin layer samples were formed, the polyimide films being obtained above, was affixed to the surface of a fixing roller and 10,000 paper sheets were passed through the fixing device. After these paper sheets were passed, the presence or absence of paper edge scratches in the resin layer sample was visually inspected. The fixing device used was a DocuCentre C2101 (trade name, manufactured by Fuji Xerox Co., Ltd.).

The evaluation was performed in accordance with the following criteria.

Good: Absence of scratches

Fair: Presence of shallow scratches having a depth of 0.5 μm or less

Poor: Presence of scratches having a depth of more than 0.5 μm

Releasability Test

The resin layer samples obtained above were evaluated in terms of releasability by the following method.

Each of the polyimide films on which the resin layer samples were formed, the polyimide films being obtained above, was affixed to the surface of a fixing roller and 10,000 paper sheets were passed through the fixing device (the same fixing device as that used above but a peeling claw was removed). In such a configuration where the peeling claw was not used, the samples in which 10,000 paper sheets were passed were evaluated as "Good" and the samples in which 10,000 paper sheets were not passed were evaluated as "Poor".

Evaluation Test in Terms of Removal Rate of Scratch

The resin layer samples obtained above were evaluated in terms of removal rate of a scratch by the following method.

Each of the resin layer samples obtained above was set to a friction tester (trade name: TRIBOGEAR, manufactured by Shinto Scientific Co., Ltd.). A sapphire needle was run for 1 cm on the resin layer sample under a load of 60 gram-weight to form a scratch in the surface of the resin layer sample. The time for which the scratch was no longer visually recognized was measured.

The evaluation was performed in accordance with the following criteria.

Excellent: the scratch disappeared within 10 seconds

Good: the scratch disappeared within 60 seconds

Fair: the scratch disappeared within 2 hours

Poor: the scratch remained after 2 hours had elapsed

TABLE 1

| Unit | Ratio of [long side chain]/[short side chain] | (B/A) | Elastic modulus % | Recovery proportion % | Martens hardness N/mm$^2$ | Dynamic (advancing) contact angle Degree | Scratching resistance test — | Releasability test — | Removal rate of scratch — |
|---|---|---|---|---|---|---|---|---|---|
| Example 1 | 0 | 2 | 93 | 99 | 2.6 | 91 | Good | Poor | Excellent |
| Example 2 | 0 | 0.2 | 76 | 94 | 20 | 93 | Good | Poor | Good |
| Example 3 | 0 | 5 | 95 | 99 | 1.6 | 90 | Good | Poor | Excellent |
| Example 4 | 0.25 | 2 | 94 | 98 | 2.3 | 91 | Good | Poor | Excellent |
| Example 5 | 0.25 | 2 | 62 | 92 | 4.8 | 108 | Good | Good | Good |
| Example 6 | 0.25 | 2 | 80 | 91 | 6.5 | 116 | Good | Good | Excellent |
| Comparative example 1 | 0 | 0.05 | 49 | 60 | 102 | 91 | Poor | Poor | Poor |
| Comparative example 2 | 0 | 15 | 100 | 99 | 0.5 | 90 | Fair | Poor | Excellent |
| Comparative example 3 | 2 | — | 42 | 56 | 108 | 92 | Poor | Poor | Poor |
| Comparative example 4 | 0 | 0.2 | 60 | 45 | 148 | 91 | Poor | Poor | Poor |
| Comparative example 5 | 2 | — | 58 | 92 | 2.4 | 107 | Good | Good | Fair |

"(B/A)" in Table 1 represents a ratio of the total molar amount (B) of hydroxyl groups contained in all the polyols used for polymerization to the total molar amount (A) of hydroxyl groups contained in all the acrylic resins used for the polymerization.

Table 1 above indicates the following facts.

In Examples 1 to 6, excellent resistance to scratching and a high removal rate of a scratch are achieved.

In Comparative example 2, although the removal rate of a scratch is high, since the sample is too soft and hence it is substantially difficult to use the sample.

Comparison between Example 5 in which the acrylic resin contains fluorine atoms and Comparative example 5 shows that the sample in Example 5 has a higher elastic modulus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin material used for a member for an image forming apparatus, the resin material comprising:
a polymer, wherein the polymer is formed by polymerization of at least one acrylic resin in which a content ratio (molar ratio) of hydroxyl groups of side chains each containing 10 or more carbon atoms to hydroxyl groups of side chains each containing less than 10 carbon atoms is less than 1/3 (the acrylic resin may contain no hydroxyl group of a side chain containing 10 or more carbon atoms);
at least one polyol that contains a plurality of hydroxyl groups in which all the plurality of hydroxyl groups are connected together through a chain containing 6 or more carbon atoms; and
an isocyanate,
with a polymerization ratio of about 0.1 or more and about 10 or less, the polymerization ratio being a ratio (B/A) of a total molar amount (B) of hydroxyl groups contained in all the polyols used for the polymerization to a total molar amount (A) of hydroxyl groups contained in all the acrylic resins used for the polymerization.

2. The resin material according to claim 1, wherein the at least one polyol contains a fluorine atom.

3. The resin material according to claim 2, wherein the at least one acrylic resin contains a fluorine atom.

4. The resin material according to claim 3, wherein the resin material has a dynamic contact angle (advancing contact angle) of about 90° or more and about 150° or less.

5. The resin material according to claim 2, wherein the resin material has a dynamic contact angle (advancing contact angle) of about 90° or more and about 150° or less.

6. The resin material according to claim 1, wherein the at least one acrylic resin contains a fluorine atom.

7. The resin material according to claim 6, wherein the resin material has a dynamic contact angle (advancing contact angle) of about 90° or more and about 150° or less.

8. The resin material according to claim 1, wherein the resin material has a dynamic contact angle (advancing contact angle) of about 90° or more and about 150° or less.

9. An endless belt for an image forming apparatus, the endless belt comprising the resin material according to claim 1 on a substantially belt-shaped base member.

10. An image fixing device comprising:
a first rotational body; and
a second rotational body that is in contact with the first rotational body to form a nipping region in which a recording medium is nipped between the first rotational body and the second rotational body,
wherein at least one of the first rotational body and the second rotational body is the endless belt for an image forming apparatus according to claim 9.

11. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
a transfer section that transfers the toner image onto a recording medium; and
the image fixing device according to claim 10 that fixes the toner image on the recording medium.

12. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
an intermediate transfer body that includes the endless belt for an image forming apparatus according to claim 9;
a first transfer section that transfers the toner image on the electrostatic latent image holding body onto the intermediate transfer body; and
a second transfer section that transfers the toner image on the intermediate transfer body onto a recording medium.

13. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
a recording medium transport body that transports a recording medium and includes the endless belt for an image forming apparatus according to claim 9; and
a transfer section that transfers the toner image on the electrostatic latent image holding body onto the recording medium on the recording medium transport body.

14. A roller for an image forming apparatus, the roller comprising the resin material according to claim 1 on a substantially tubular base member.

15. An image fixing device comprising:
a first rotational body; and
a second rotational body that is in contact with the first rotational body to form a nipping region in which a recording medium is nipped between the first rotational body and the second rotational body,
wherein at least one of the first rotational body and the second rotational body is the roller for an image forming apparatus according to claim 14.

16. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
a transfer section that transfers the toner image onto a recording medium; and
the image fixing device according to claim 15 that fixes the toner image on the recording medium.

17. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
an intermediate transfer belt wrapped around a roller for an image forming apparatus according to claim 14;
a first transfer section that transfers the toner image on the electrostatic latent image holding body onto the intermediate transfer body; and
a second transfer section that transfers the toner image on the intermediate transfer body onto a recording medium.

18. An image forming apparatus comprising:
an electrostatic latent image holding body;
an electrostatic latent image forming section that forms an electrostatic latent image on a surface of the electrostatic latent image holding body;
a developing section that develops the electrostatic latent image by using toner to form a toner image;
a recording medium transport belt that transports a recording medium and is wrapped around a roller for an image forming apparatus according to claim 14; and
a transfer section that transfers the toner image on the electrostatic latent image holding body onto the recording medium on the recording medium transport body.

* * * * *